US012198615B2

(12) United States Patent
Watsuda

(10) Patent No.: US 12,198,615 B2
(45) Date of Patent: Jan. 14, 2025

(54) DISPLAY DEVICE

(71) Applicant: Innolux Corporation, Miao-Li County (TW)

(72) Inventor: Hirofumi Watsuda, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/323,420

(22) Filed: May 25, 2023

(65) Prior Publication Data

US 2023/0298514 A1 Sep. 21, 2023

Related U.S. Application Data

(63) Continuation of application No. 17/529,289, filed on Nov. 18, 2021, now Pat. No. 11,699,387, which is a continuation of application No. 16/232,081, filed on Dec. 26, 2018, now abandoned.

(60) Provisional application No. 62/697,560, filed on Jul. 13, 2018.

(51) Int. Cl.
*G09G 3/32* (2016.01)
*G09G 3/20* (2006.01)

(52) U.S. Cl.
CPC ............. *G09G 3/32* (2013.01); *G09G 3/2018* (2013.01); *G09G 2300/0439* (2013.01); *G09G 2320/0247* (2013.01)

(58) Field of Classification Search
CPC ................... G09G 3/32; G09G 3/2018; G09G 2300/0439; G09G 2320/0247; G09G 2300/08; G09G 2310/0224; G09G 2310/065; G09G 3/3225; G09G 3/2022; G09G 3/2074; G09G 3/2077; G09G 2230/00; G09G 2320/02
See application file for complete search history.

(56) References Cited

U.S. PATENT DOCUMENTS

2006/0279478 A1* 12/2006 Ikegami ................. G09G 3/325 345/30
2017/0200412 A1* 7/2017 Gu ....................... G09G 3/3266

FOREIGN PATENT DOCUMENTS

KR 20060112994 11/2006

OTHER PUBLICATIONS

"Office Action of Korea Counterpart Application", issued on Oct. 27, 2023, p. 1-p. 10.

* cited by examiner

*Primary Examiner* — Matthew A Eason
*Assistant Examiner* — Chayce R Bibbee
(74) *Attorney, Agent, or Firm* — JCIPRNET

(57) ABSTRACT

A display device includes a plurality of pixels. The pixels are configured to be operated in a plurality of frame periods. Each of the frame periods includes at least two first emission periods corresponding to a first scan signal and at least two second emission periods corresponding to a second scan signal. Each of the pixels includes a light emitting diode and a driving circuit coupled to the light emitting diode. In a same frame period, a first pixel of the plurality of pixels is emitted in the at least two first emission periods and a second pixel of the plurality of pixels is emitted in the at least two second emission periods.

8 Claims, 18 Drawing Sheets

DISPLAY DEVICE

CROSS-REFERENCE TO RELATED APPLICATION

This application is a continuation application of and claims the priority benefit of U.S. application Ser. No. 17/529,289, filed on Nov. 18, 2021. The prior U.S. application Ser. No. 17/529,289 is a continuation application of and claims the priority benefit of U.S. application Ser. No. 16/232,081, filed on Dec. 26, 2018, which claims the priority benefit of U.S. provisional application Ser. No. 62/697,560, filed on Jul. 13, 2018. The entirety of each of the above-mentioned patent applications is hereby incorporated by reference herein and made a part of this specification.

BACKGROUND

1. Field of the Disclosure

The present disclosure generally relates to display technology, and particularly to a driving mechanism to the pixels.

2. Description of Related Art

Display includes a large number of pixels to display an image in a display frame period. The pixel in an example includes a light emitting diode to emit a light. To drive the pixels to emit the light corresponding to the given gray level of color, a driving circuit is included to turn on the light emitting diode at an emission period in the display frame period, which usually is a time period between two scan signal pulses. In operation, each light emitting diode emits the light within an emission period as assigned. The light intensity corresponding to the gray level is determined by the data signal, which has carried the gray level as intended to the light emitting diode.

In general, an active matrix LED display with a hold drive scheme, gray level is controlled by driving current of LED device. As observed, the light emitting intensity is not stable or has large variation in low driving current range due to LED device characteristics. Semi-hold drive scheme may improve above issue by using larger driving current with short emission period. However, it has a risk of flicker due to the repetition of ON and OFF of light emitting, in an example.

How to improve the drive scheme without increasing data scan frequency is an issue to be looked into and improved.

SUMMARY

The disclosure provides a display device, wherein the driving schemes are proposed to improve the display quality.

In an embodiment, the disclosure provides a display device including a plurality of pixels. The pixels are configured to be operated in a plurality of frame periods. Each of the frame periods includes at least two first emission periods corresponding to a first scan signal and at least two second emission periods corresponding to a second scan signal. Each of the pixels includes a light emitting diode and a driving circuit coupled to the light emitting diode. In a same frame period, a first pixel of the plurality of pixels is emitted in the at least two first emission periods and a second pixel of the plurality of pixels is emitted in the at least two second emission periods.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The disclosure is directed to a display device with the proposed driving mechanism to cause the pixels of the display device to emit the light with at least less risk of the flicker phenomenon.

Several embodiments are provided for describing the disclosure but the disclosure is not just limited to the embodiments as provided.

Figure 1:
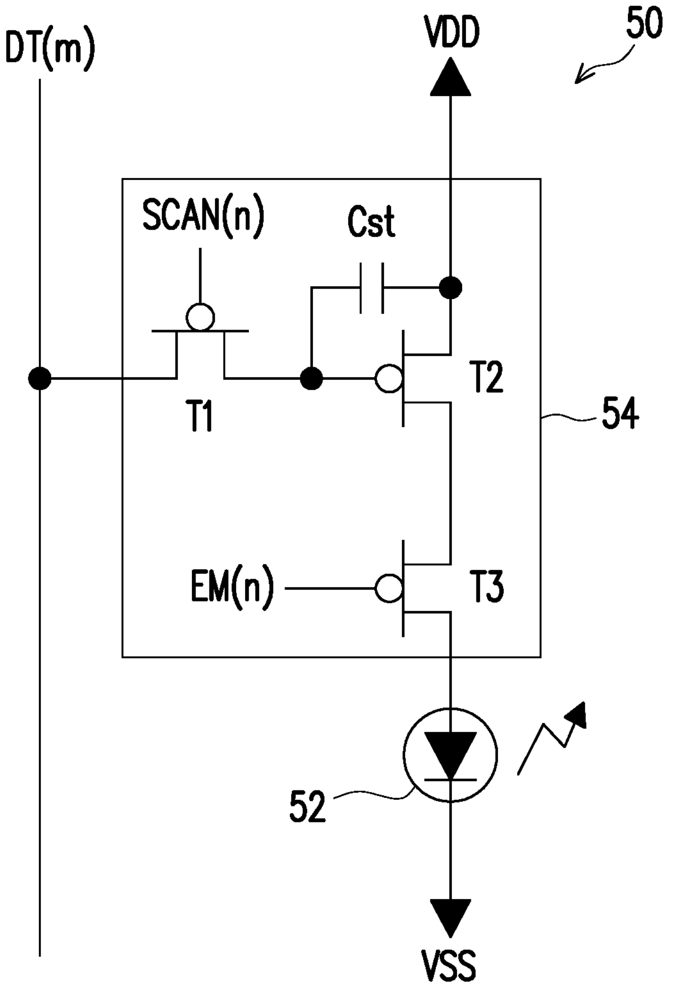
FIG. 1 is a drawing, schematically illustrating a pixel circuit of the display device, according to an embodiment of the disclosure.

FIG. 1 is a drawing, schematically illustrating a pixel circuit of the display device, according to an embodiment of the disclosure. Referring to FIG. 1, as usually known, the display device includes a large number of pixels 50, which form a pixel array. The pixel 50 includes a light emitting diode 52 and a driving circuit 54 coupled to the light emitting diode 52 to cause the light emitting diode 52 to emit the light according to an emission period as requested in a display frame period. The driving circuit 54 includes an enable switch T3, such as a transistor switch to receive the enable signal EM (n) to produce the emission period, in which period the driving circuit 54 is enabled to drive the light emitting diode 52. The emission period can be seen in signal waveform in time sequence as to be described latter. In addition, as usually known, the scan signal SCAN(n) controls another switch T1 to allow the pixel data transmitted from data line DT(m) to be stored in the capacitor Cst connected with a transistor T2. The driving circuit 54 and the light emitting diode 52 are coupled in series between the high voltage source VDD and the low voltage source VSS.

Figure 2:
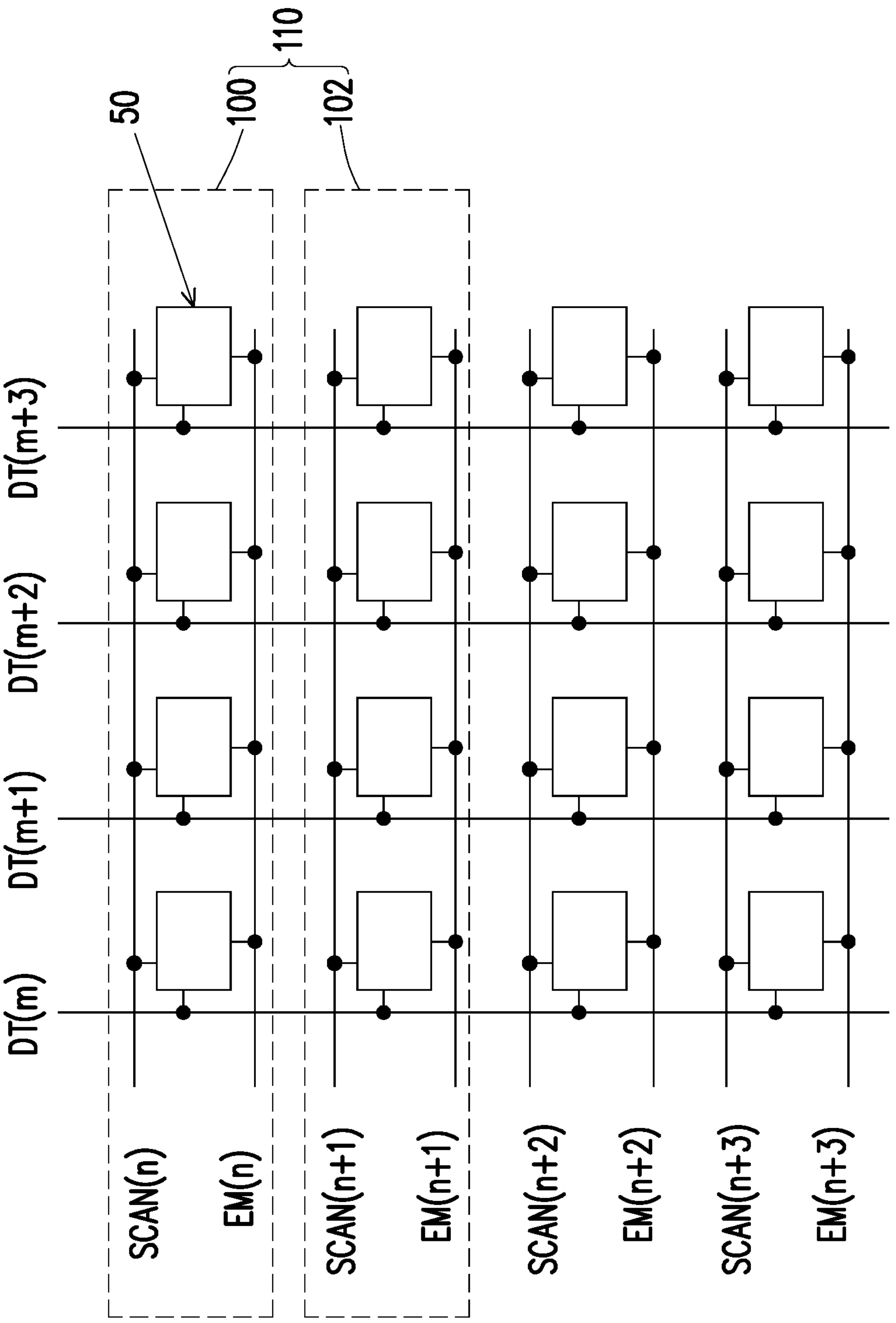
FIG. 2 is a drawing, schematically illustrating the structure of a pixel array of a display device, according to an embodiment of the disclosure.

FIG. 2 is a drawing, schematically illustrating the structure of a pixel array of a display device, according to an embodiment of the disclosure. Referring to FIG. 2, the pixels 50 are arranged into an array with pixel rows and pixel columns. The pixel rows are horizontally extending and the pixel column are extending substantially perpendicular to the pixel rows. Each row or each column in the array structure includes multiple pixels, in an embodiment. Each pixel of the pixel rows is connected to a scan line SCAN(n), a data line DT(m), and an enable line EM(n). The pixels row is discerned by the index n and the pixel column is discerned by the index m. Starting from the index n and m for the pixel row and the pixel column as an example, the index n and m for the next row and column would be add by 1 as indicated. In an example, the pixel row 100 has the index n and the next pixel row 102 has the index n+1. In an example, the pixel row 100 and the pixel row 102 may form abutting two pixel rows 110. In this situation, the pixel row 100 may be referred as a first pixel row and the pixel row 102 may be referred as a second pixel row.

Figure 3:
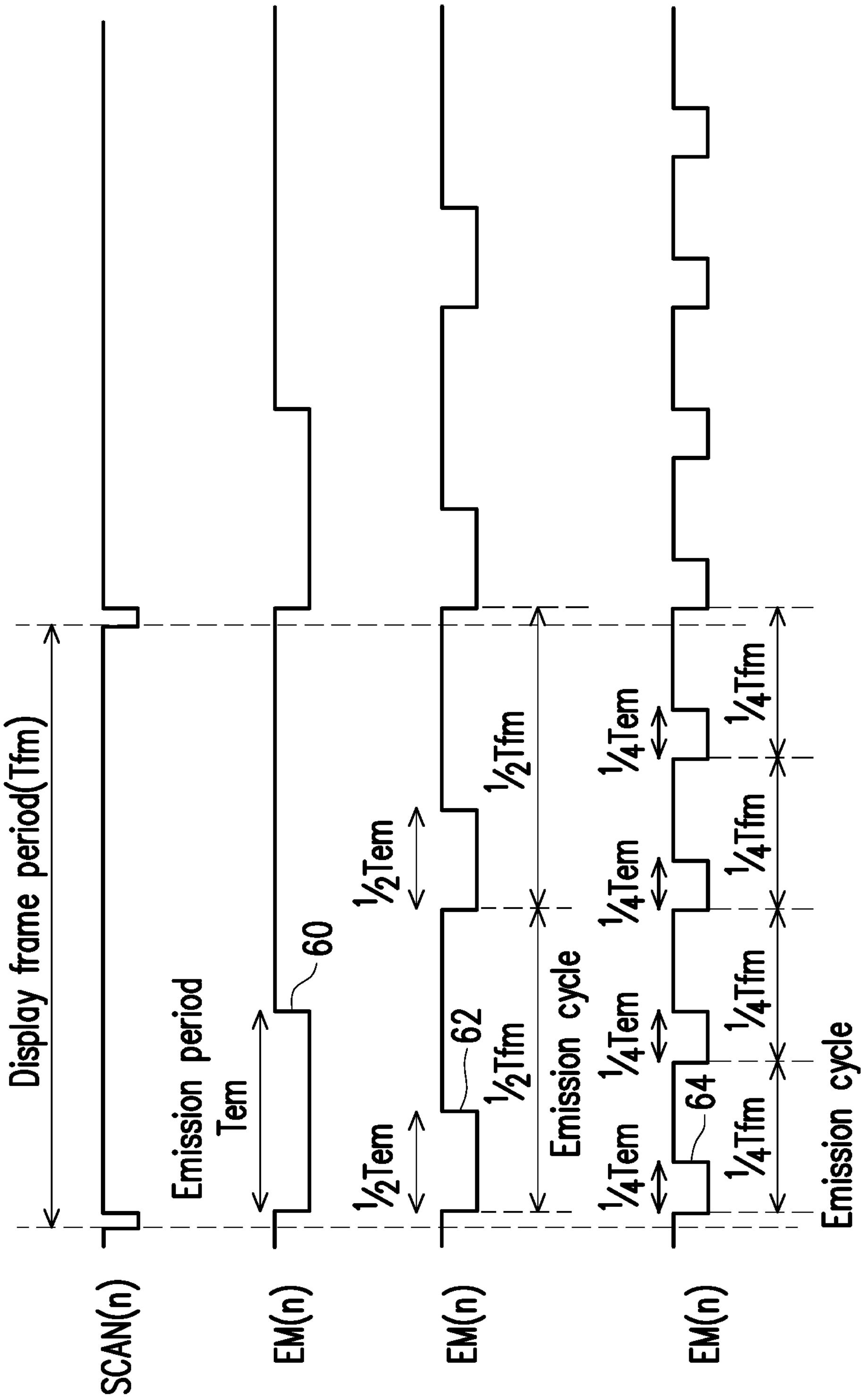
FIG. 3 is a drawing, schematically illustrating the various signals in time sequence, according to an embodiment of the disclosure.

FIG. 3 is a drawing, schematically illustrating the various signal in time sequence, according to an embodiment of the disclosure. Referring to FIG. 3, the scan signal SCAN(n) is corresponding to a display frame period $T_{fm}$. During the display frame period $T_{fm}$, a set of pixels in an image frame are turned on to display. The display frame period $T_{fm}$ is requested by the display device as a duty cycle in the display frame period.

In an embodiment, the light emitting diode 52 is not fully held on during the display frame period $T_{fm}$. The enable signal EM(n) allows setting the time period to actually turn on the light emitting diode 52. The enable signal EM(n) has the emission period 60 as indicated by $T_{em}$ for a single duty cycle, in which the light emitting diode 52 is actually turned on to emit the light. However, in an embodiment of the disclosure, the emission period 60 in a single emission cycle as originally requested by the display device may be divided into at least two emission periods but the total amount of the at least two emission periods 62 remains the same as the emission period 60 with the amount of $T_{em}$. Thus, the emission cycle comprises at least one emission periods in the display frame period.

In an embodiment, the emission period 60 as requested is equally divided into two emission periods $T_{em}/2$ with half of emission period $T_{em}$, in which a certain variation within a range to have the emission periods $T_{em}/2$ is still acceptable, in which rage is within 10% variation or smaller. Further in an embodiment, the two emission periods 62 are uniformly distributed in the display frame period $T_{fm}$. The term "uniformly" or "equally" typically means within +/−10% of the stated value of emission period, more typically +/−5% of the stated value of emission period, more typically +/−3% of the stated value of emission period, more typically +/−2% of the stated value of emission period, more typically +/−1% of the stated value of emission period and even more typically +/−0.5% of the stated value of emission period. The stated value of the present disclosure is an approximate value and the others will be non-equally. When there is no specific description, the stated value of emission period includes the meaning of "about" or "substantially".

Further in an embodiment, the emission period 60 is equally divided into four emission periods 64 with period of $T_{em}/4$ as a quarter of the emission period $T_{em}$. Likewise, the four emission periods 64 are uniformly distributed in the display frame period $T_{fm}$. The term "uniformly" typically means that all of the emission periods and the emission cycles in the display frame period are equally. And at least one of the emission periods and/or at least one of the emission cycles in the display frame period are not equally means non-uniformly.

As a result, the emission frequency in actual operation is increased. At least the flicker phenomenon can be reduced. The number of the emission periods can be set depending on the actual capability. The emission cycles may be not uniformly distributed in the display frame period $T_{fm}$, in an embodiment.

Figure 4:
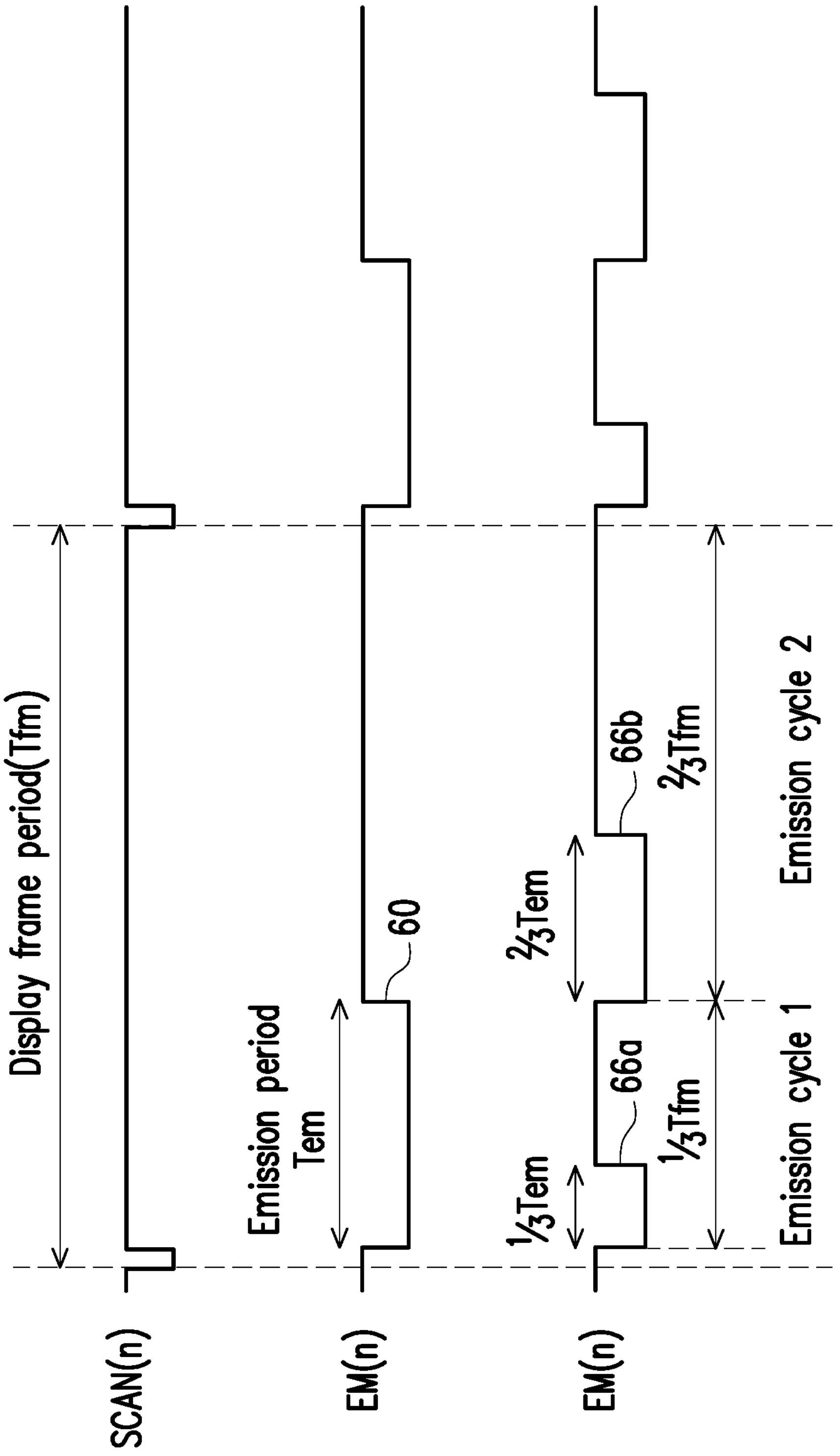
FIG. 4 is a drawing, schematically illustrating the various signals in time sequence, according to an embodiment of the disclosure.

FIG. 4 is a drawing, schematically illustrating the various signals in time sequence, according to an embodiment of the disclosure. Referring to FIG. 4, even further in an embodiment, the emission period 60 may be not equally divided. In the embodiment, the emission period 60 is divided into an emission period 66*a* and an emission period 66*b*. The emission period 66*a* may be one third of the emission period 60 by ⅓$T_{em}$. Another emission period 66*b* may be two third of the emission period 60 by ⅔$T_{em}$. The emission cycle 1 and the emission cycle 2 may be equal or not equal.

The embodiment above is with respect to one pixel itself. However, if the emission period 60 is not divided, a similar effect to the embodiments with dividing the emission period 60.

Figure 5:
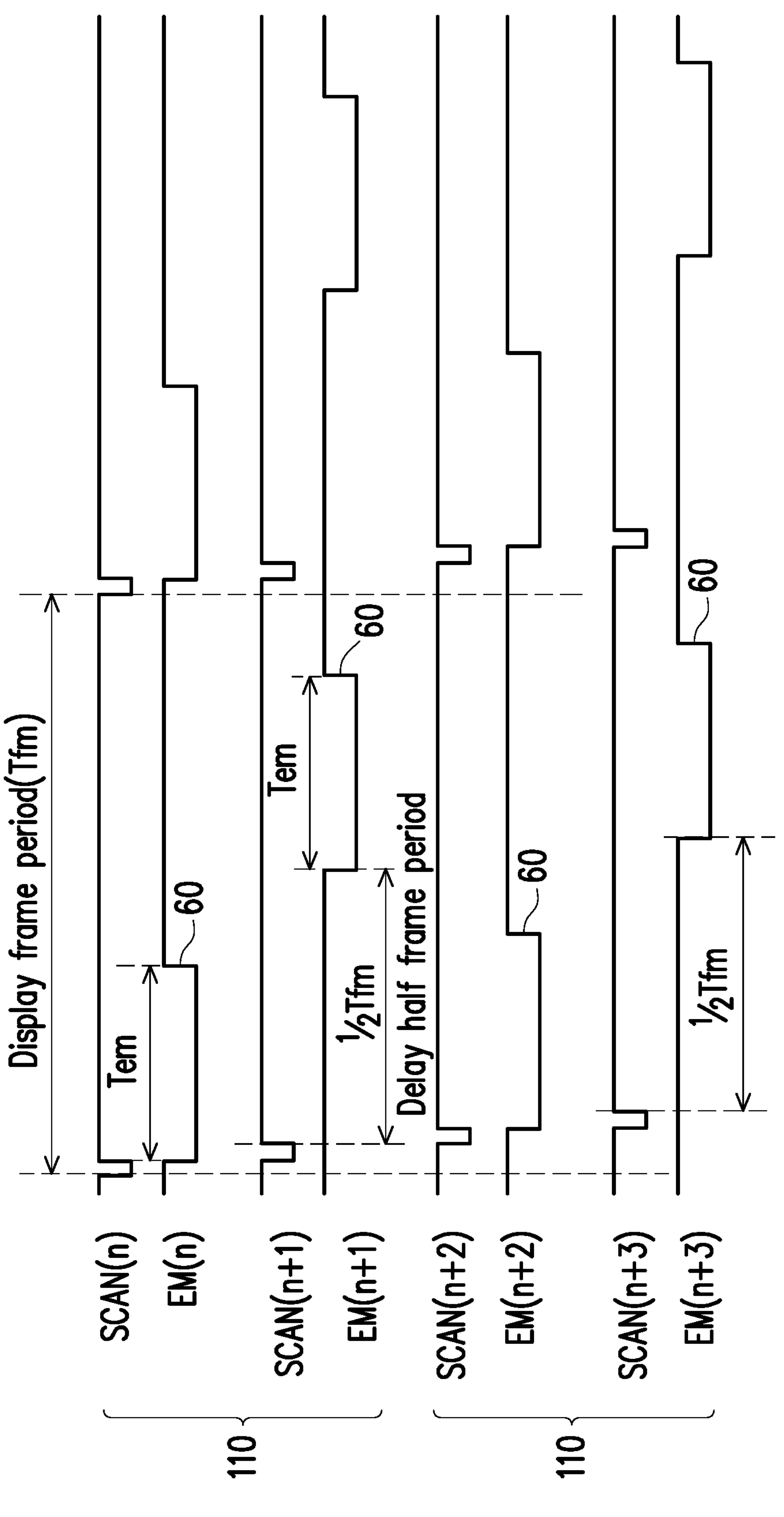
FIG. 5 is a drawing, schematically illustrating the various signals in time sequence, according to an embodiment of the disclosure.

FIG. 5 is a drawing, schematically illustrating the various signals in time sequence, according to an embodiment of the disclosure. Referring to FIG. 5, if the emission period 60 is not divided but the similar effect to at least reduce the flicker is intended, it can extend the pixel into row or column. Also referring to FIG. 2, the group of abutting two pixel rows 110 may be properly controlled by the enable signals EM(n) and EM(n+1). Likewise, the index n+2 and the index n+3 form another group of abutting two pixel rows 110. The display frame period $T_{fm}$ may be divided into two periods of half display frame period ½ $T_{fm}$. Taking the enable signals EM(n) as a reference one then the enable signals EM(n+1) may be delayed by a certain delay time to shift away, such as half display frame period ½ $T_{fm}$ in actual operation. As a result, the time sequences for the pixel row 100 and the pixel row 102 of the abutting two pixel rows 110 are staggered. As viewed from the first pixel column as an example, the emission period of the first pixel of the pixel row 100 and the emission period of the first pixel of the second pixel row 102 within the display frame period are not overlapping. In an example, the emission period of the first pixel of the second pixel row 102 is activated by shifting from the scan signal SCAN(n+1) by about ½ $T_{fm}$. The two emission periods 60 for the two pixels in the same pixel column of the abutting two pixel rows 110 are not overlapping. This arrangement may be referred as a stagger arrangement.

Figure 6:
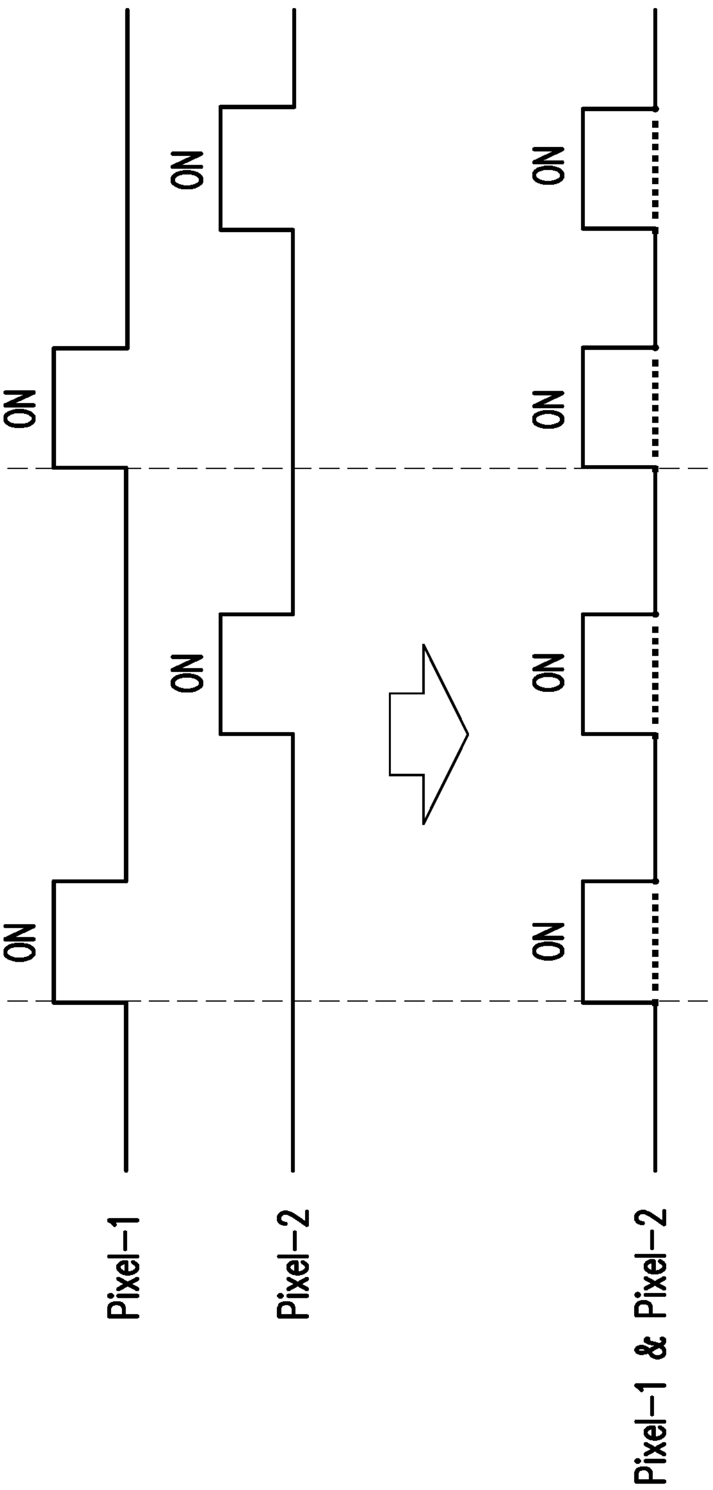
FIG. 6 is a drawing, schematically illustrating the turning sequence for abutting two pixels, according to an embodiment of the disclosure.

FIG. 6 is a drawing, schematically illustrating the turning sequence for abutting two pixels, according to an embodiment of the disclosure. Referring to FIG. 6, taking the pixels, indicated by pixel-1, belonging to the pixel row 100 for comparison, the pixels, indicated by pixel-2, belonging to the pixel row 102 are enabled with a timing shift by half display frame period ½ $T_{fm}$. However, in total effect from the pixel-1 and pixel-2 are two emission cycles in one display frame period. The frequency in total effect is increased.

Figure 7:
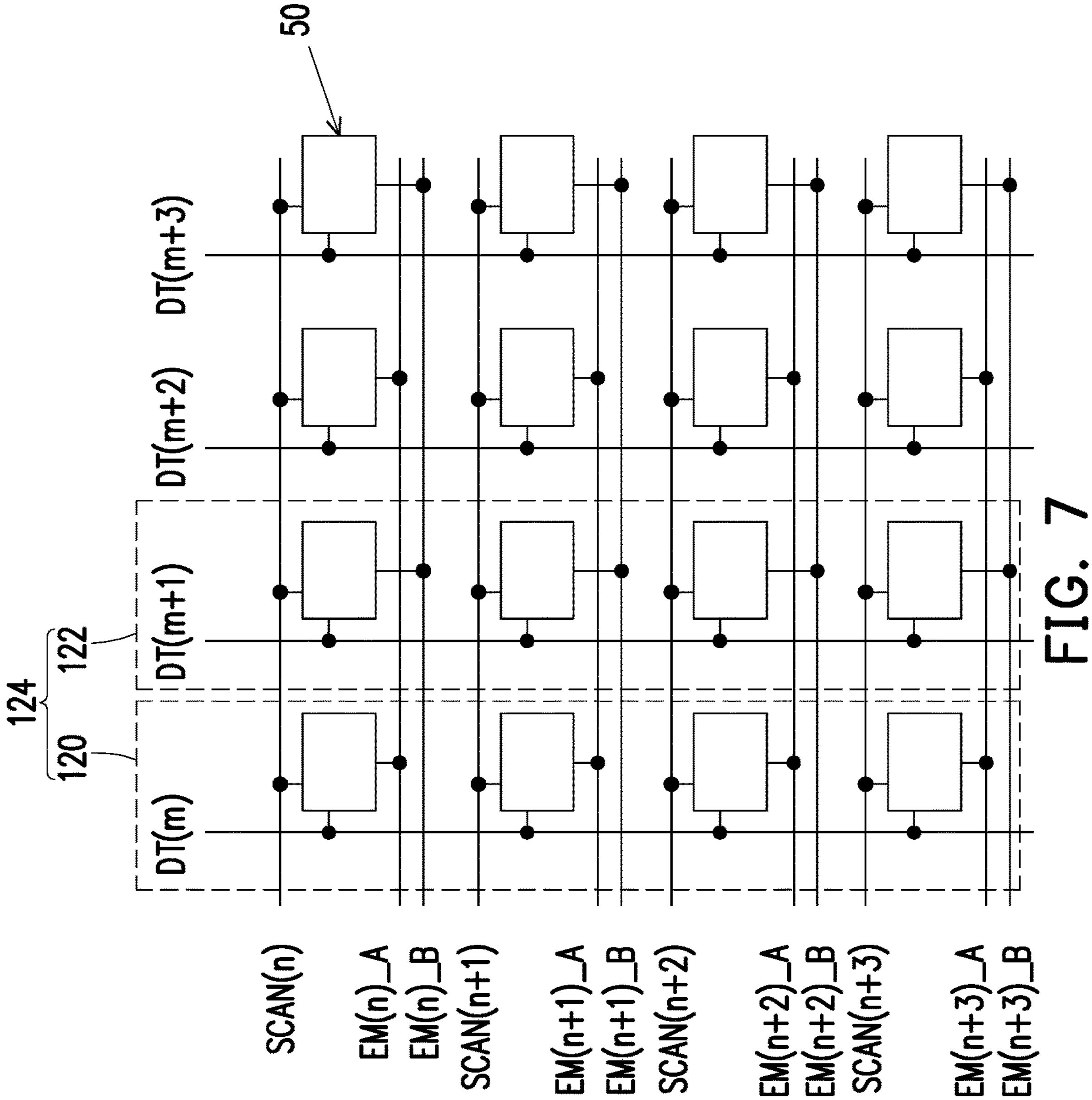
FIG. 7 is a drawing, schematically illustrating the structure of a pixel array of a display device, according to an embodiment of the disclosure.

FIG. 7 is a drawing, schematically illustrating the structure of a pixel array of a display device, according to an embodiment of the disclosure. Referring to FIG. 7, the arrangement for the pixel row may be applied to the arrangement for the pixel columns. To the column arrangement, the pixel column 120 and the pixel column 122 may form a group of abutting two columns 124. In this manner, one pixel row needs two enable signals EM(n)_A and EM(n)_B corresponding to the pixel column 120 and the pixel column 122. The pixel column 120 may also be referred as a first pixel column. The pixel column 122 may be referred as a second pixel column.

Figure 8:
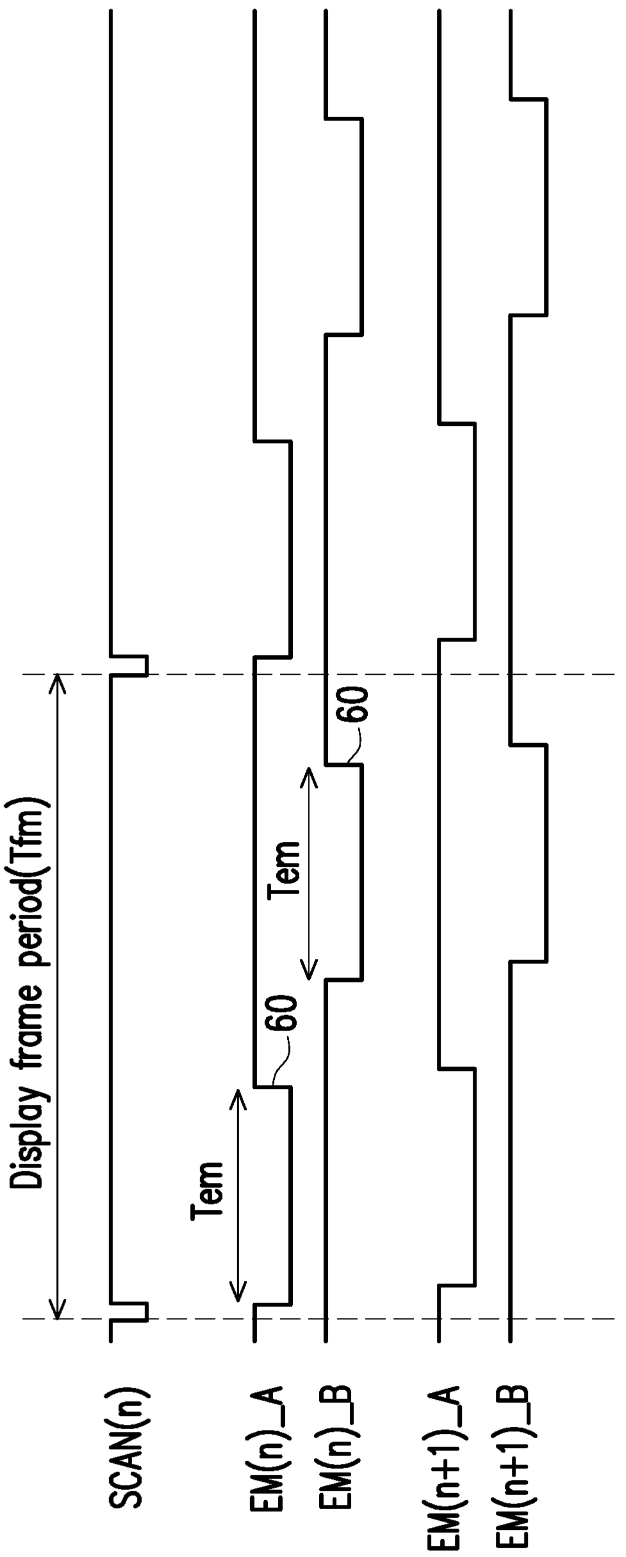
FIG. 8 is a drawing, schematically illustrating the various signals in time sequence, according to an embodiment of the disclosure.

FIG. 8 is a drawing, schematically illustrating the various signals in time sequence, according to an embodiment of the disclosure. Referring to FIG. 8, to control the abutting two pixel columns 124 to have staggered emission period 60, the enable signal EM(n)_A and the enable signal EM(n)_B are staggered. In an example, the enable signal EM(n)_B is delayed instead of the enable signal EM(n+1) in FIG. 5. In this embodiment, as viewed from a pixel row, the emission periods of the abutting two pixels, such pixel index m and m+1, belonging to abutting two pixel columns 120, 122 are staggered. Same arrangement for the next abutting two pixel, m+2 and m+3 in the same pixel row is applied. Same arrangement is applied to the pixels in the pixel rows with index n+1, n+2, . . . . In other words, the emission period (Tem) 60 for the signal EM(n)_A is not overlapping with the emission period 60 for the signal EM(n)_B. Further, the term of "abutting" in other words means the closest two, such as a relation of n and n+1 or a relation of m and m+1. Basically, the abutting two pixels is indicating the closest two pixels at the concerning direction such as row direction or column direction, or the diagonal direction as to be described later.

Figure 9:
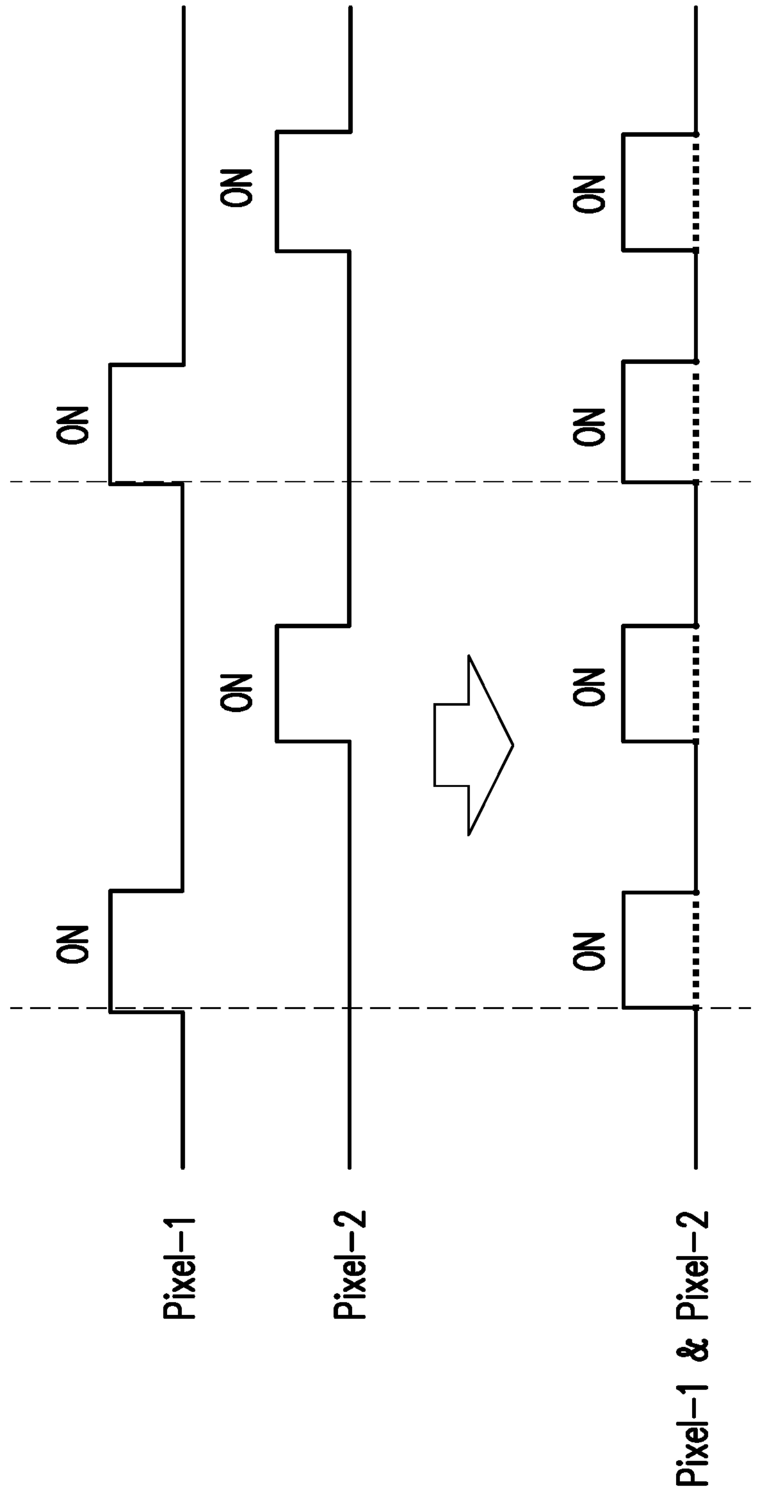
FIG. 9 is a drawing, schematically illustrating the turning sequence for abutting two pixels, according to an embodiment of the disclosure.

FIG. 9 is a drawing, schematically illustrating the turning sequence for abutting two pixels, according to an embodiment of the disclosure. Referring to FIG. 9, the result is similar to the result in FIG. 6 but pixel-1 represents one pixel column and pixel-2 represents abutting one pixel column.

Figure 10:
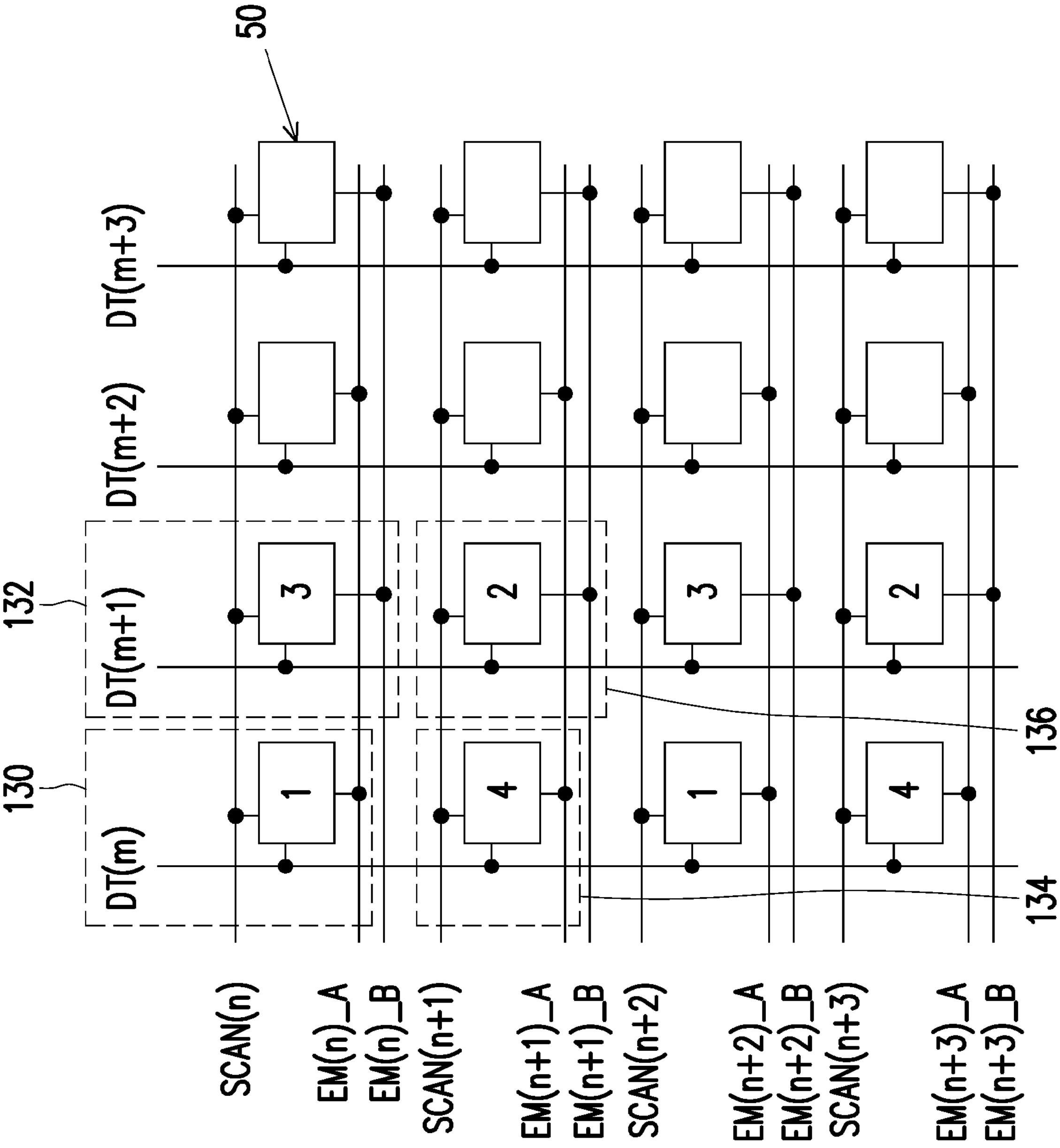
FIG. 10 is a drawing, schematically illustrating the structure of a pixel array of a display device, according to an embodiment of the disclosure.

Even further in an embodiment, FIG. 10 is a drawing, schematically illustrating the structure of a pixel array of a display device, according to an embodiment of the disclosure. Referring to FIG. 10, the pixels 50 may comprise a first pixel 130 and a second pixel 136 being abutting in a diagonal direction. In addition, the pixels 50 may comprise a third pixel 132 and a fourth pixel 134 being abutting in another diagonal direction crossing the previous one. In an embodiment, the first pixel 130, the second pixel 136, the third pixel 132 and the fourth pixel 134 being abutting to one another form a quadrilateral unit, in which the emission periods are further arranged. The quadrilateral unit for describing in the embodiments are not just limited to the embodiments as provided. The first pixel 130, the second pixel 136, the third pixel 132 and the fourth pixel 134 are formed as PenTile matrix which is alike the quadrilateral unit. The shape of the quadrilateral unit is not just limited to rectangular shape as shown in drawing. In examples, the shape of the quadrilateral unit can be diamond, parallelogram or a unit not parallel to the gate line or the data line. The disclosure is generally not limited to a specific shape. In addition, the array structure in FIG. 10 is just an example, in which the column direction is perpendicular to the row direction, so the diagonal direction is a direction determined by a rectangle shape. However, the array structure may be other arrangement other than FIG. 10. The abutting two pixels in the diagonal direction in an example are referring to the first pixel of the first pixel row and the second pixel of the second row, in which the connection of the two pixels forms a diagonal direction. Likewise, the second pixel of the first pixel row and the first pixel of the second row in connection forms another diagonal direction, crossing the previous diagonal direction. Generally, the diagonal direction may be a direction not parallel or perpendicular to the gate line or the data line. The disclosure is not limited to the embodiments as provided.

The emission periods for the first pixel 130 and the second pixel 136 are separated in time. The first pixel 130 and the second pixel 136 are abutting two form another diagonal direction.

Figure 11:
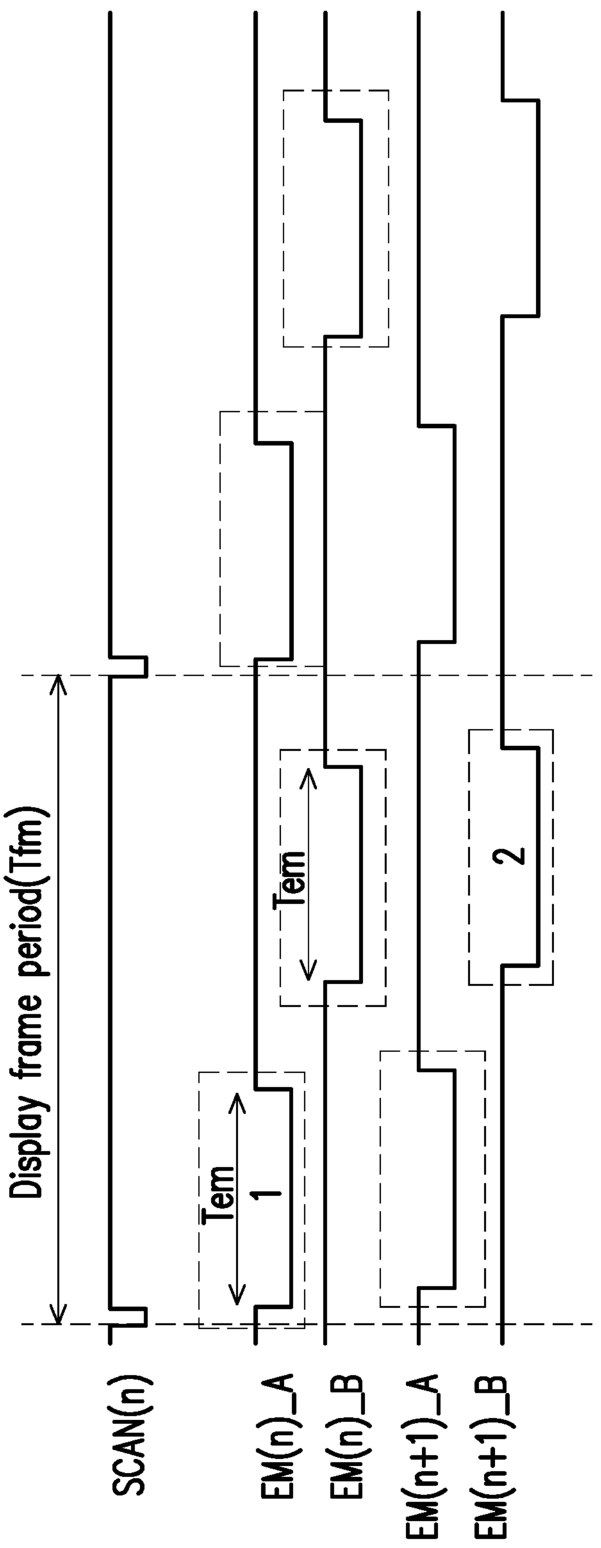
FIG. 11 is a drawing, schematically illustrating the various signals in time sequence, according to an embodiment of the disclosure.

FIG. 11 is a drawing, schematically illustrating the various signals in time sequence, according to an embodiment of the disclosure. Referring to FIGS. 10 and 11, first to describe the enable signals EM(n)_A, EM(n+1)_B for the first pixel 130 and the second pixel 136, the enable signals EM(n)_A may start according to the scan signal SCAN(n). It has the original emission period 60 with period of $T_{em}$. The enable signal EM(n+1)_B controls the second pixel 136. The enable signal EM(n+1)_B is delayed by a certain time to shift away from the enable signals EM(n)_A, such as a delay of half display frame period $T_{fm}$.

Likewise, the third pixel 132 and the fourth pixel 134 are controlled by the enable signals EM(n)_B and the enable signal EM(n+1)_A with the same effect to the first pixel 130 and the second pixel 136.

Figure 12:
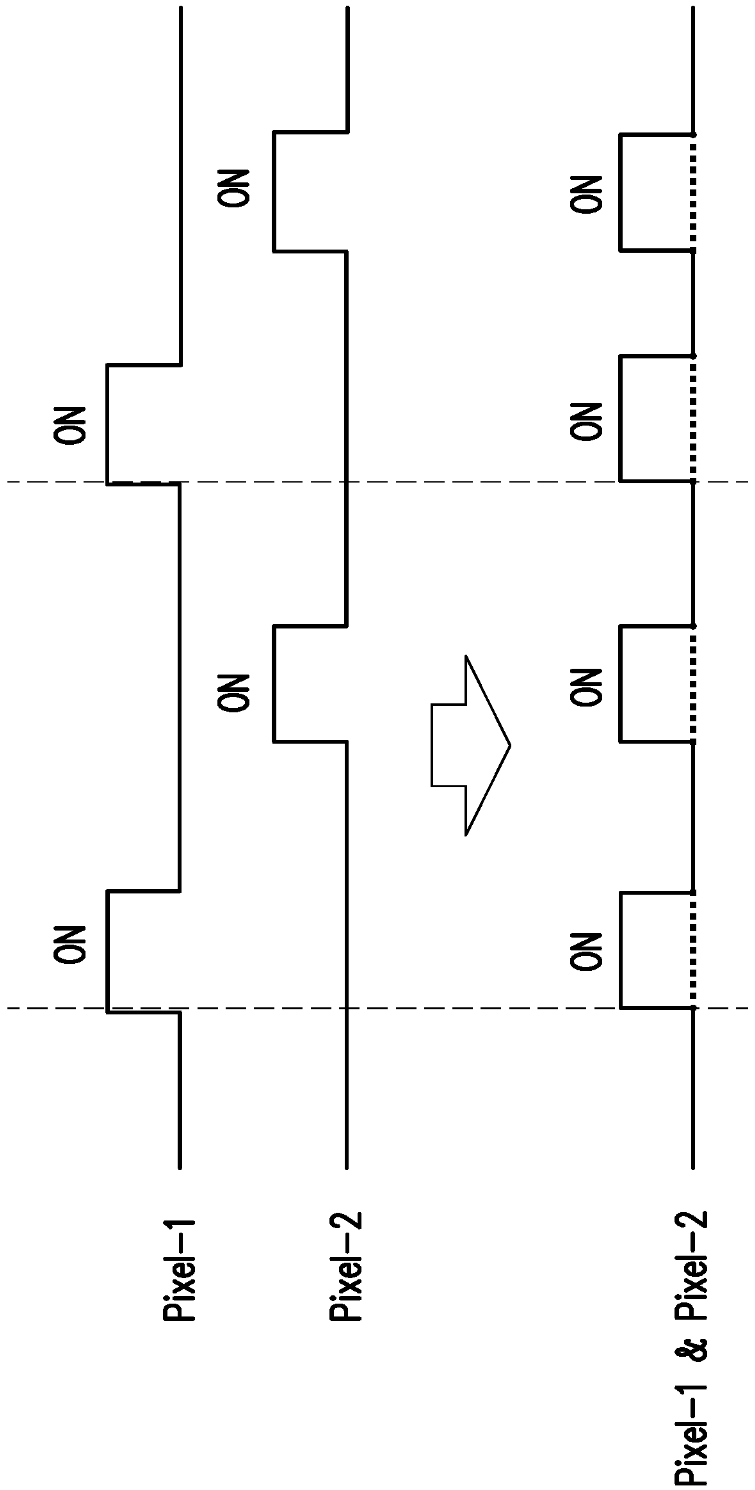
FIG. 12 is a drawing, schematically illustrating the turning sequence for abutting two pixels, according to an embodiment of the disclosure.

FIG. 12 is a drawing, schematically illustrating the turning sequence for abutting two pixels, according to an embodiment of the disclosure. Referring to FIG. 12, similar to FIGS. 6 and 9, the emission period 60 for the abutting two pixels in diagonal direction are staggered.

Figure 13:
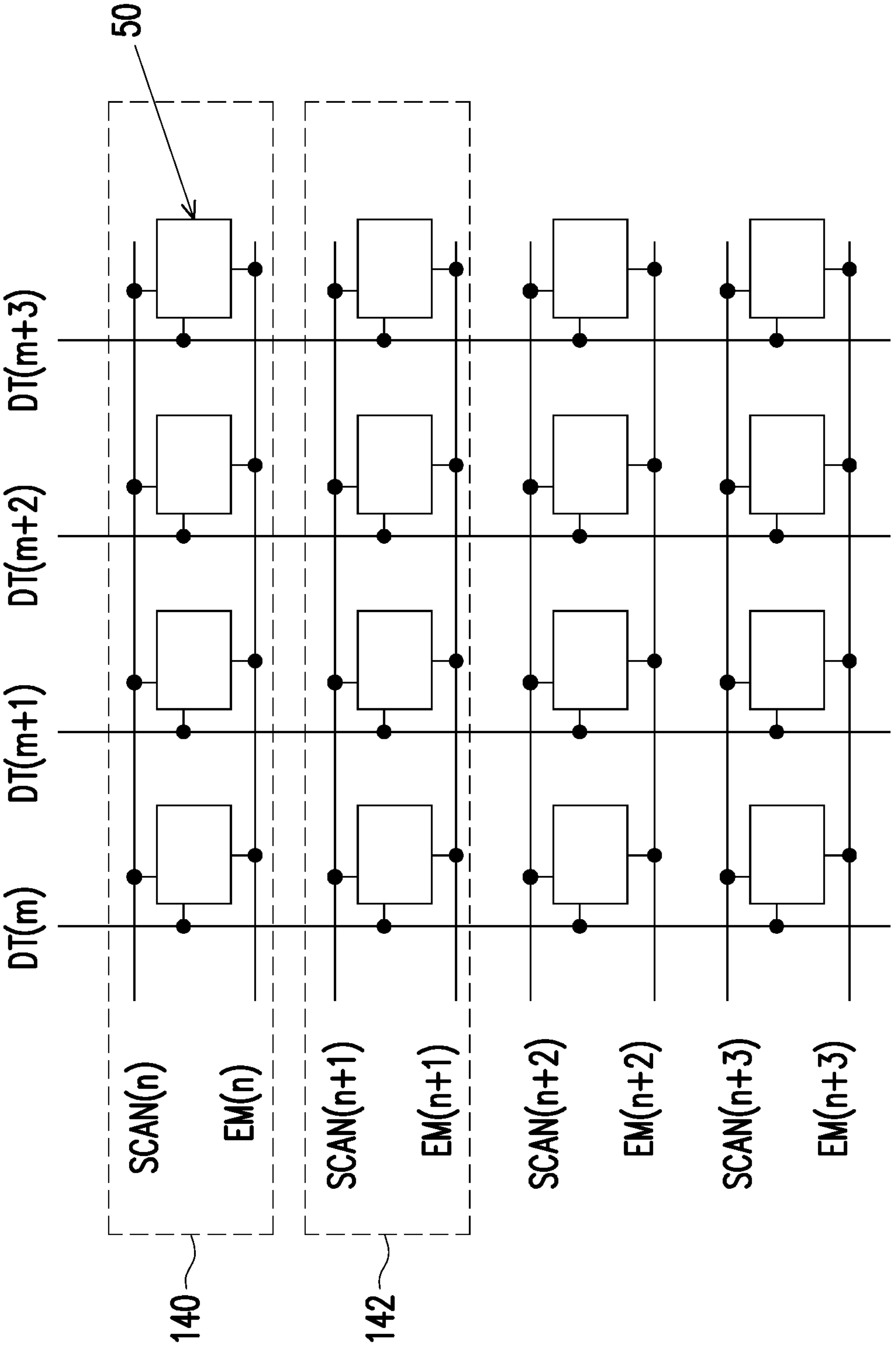
FIG. 13 is a drawing, schematically illustrating the structure of a pixel array of a display device, according to an embodiment of the disclosure.
Figure 14:
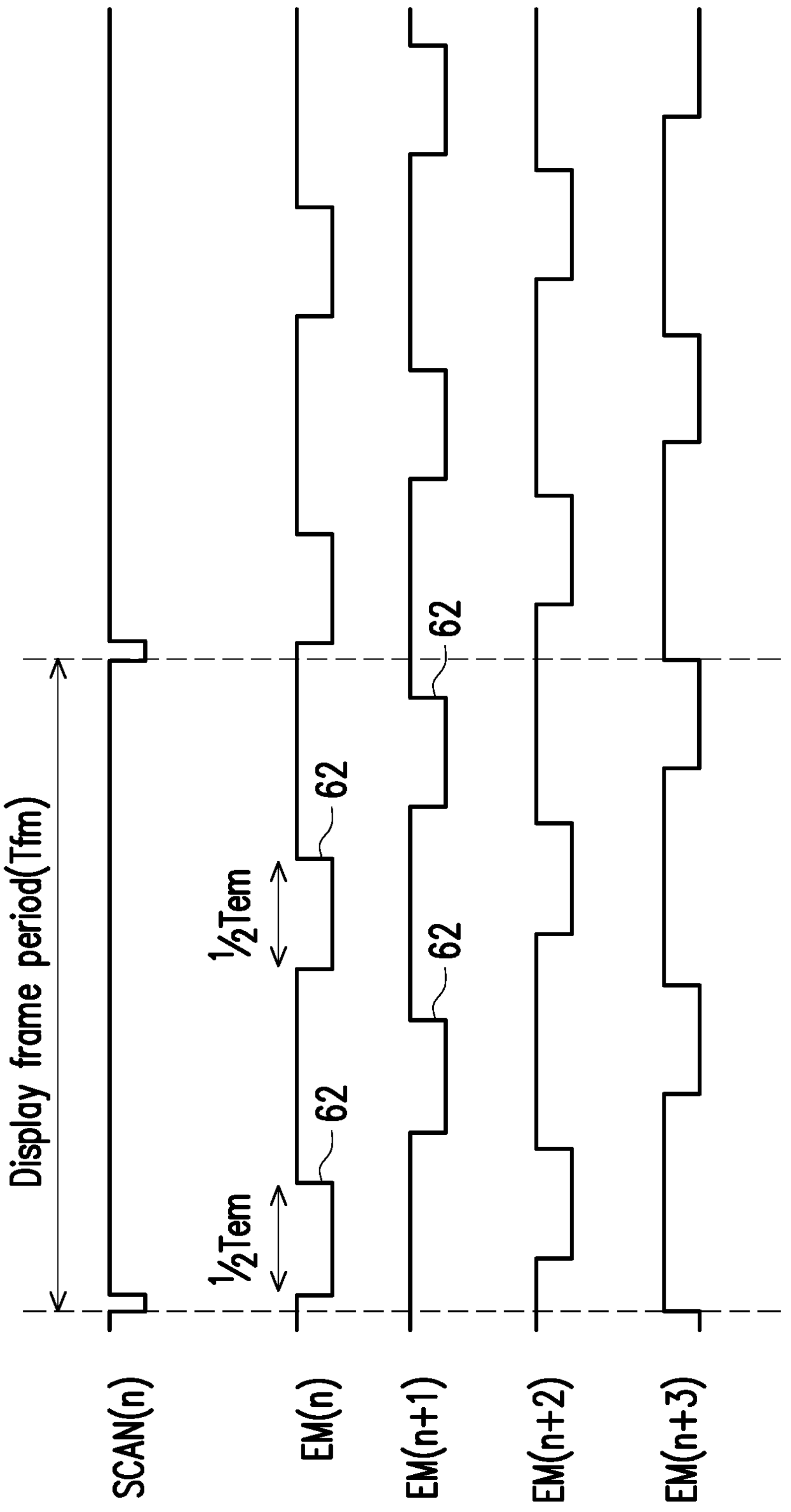
FIG. 14 is is a drawing, schematically illustrating the various signals in time sequence, according to an embodiment of the disclosure.

Even further in an embodiment, the features to divide the emission period 60 into multiple emission periods and to staggered the emission periods for the abutting two pixels may be combined together. FIG. 13 is a drawing, schematically illustrating the structure of a pixel array of a display device, according to an embodiment of the disclosure. FIG. 14 is a drawing, schematically illustrating the various signals in time sequence, according to an embodiment of the disclosure. Referring to FIG. 13 and FIG. 14, in this manner, taking the pixel rows 140 and the pixel row 142 as an example, each pixel row is controlled by single enable signal EM(n), EM(n+1). To combine the features as described in FIG. 3 or FIG. 4, each emission period 60 respectively controlled by the enable signal EM(n), EM(n+1) . . . is equally divided into two emission periods 62. However, the emission periods 62 for the enable signal EM(n) and the enable signal EM(n+1) are staggered. The enable signal EM(n+2) and enable signal EM(n+3) are similar to the enable signal EM(n) and enable signal EM(n+1) are repeating arrangement.

Figure 15:
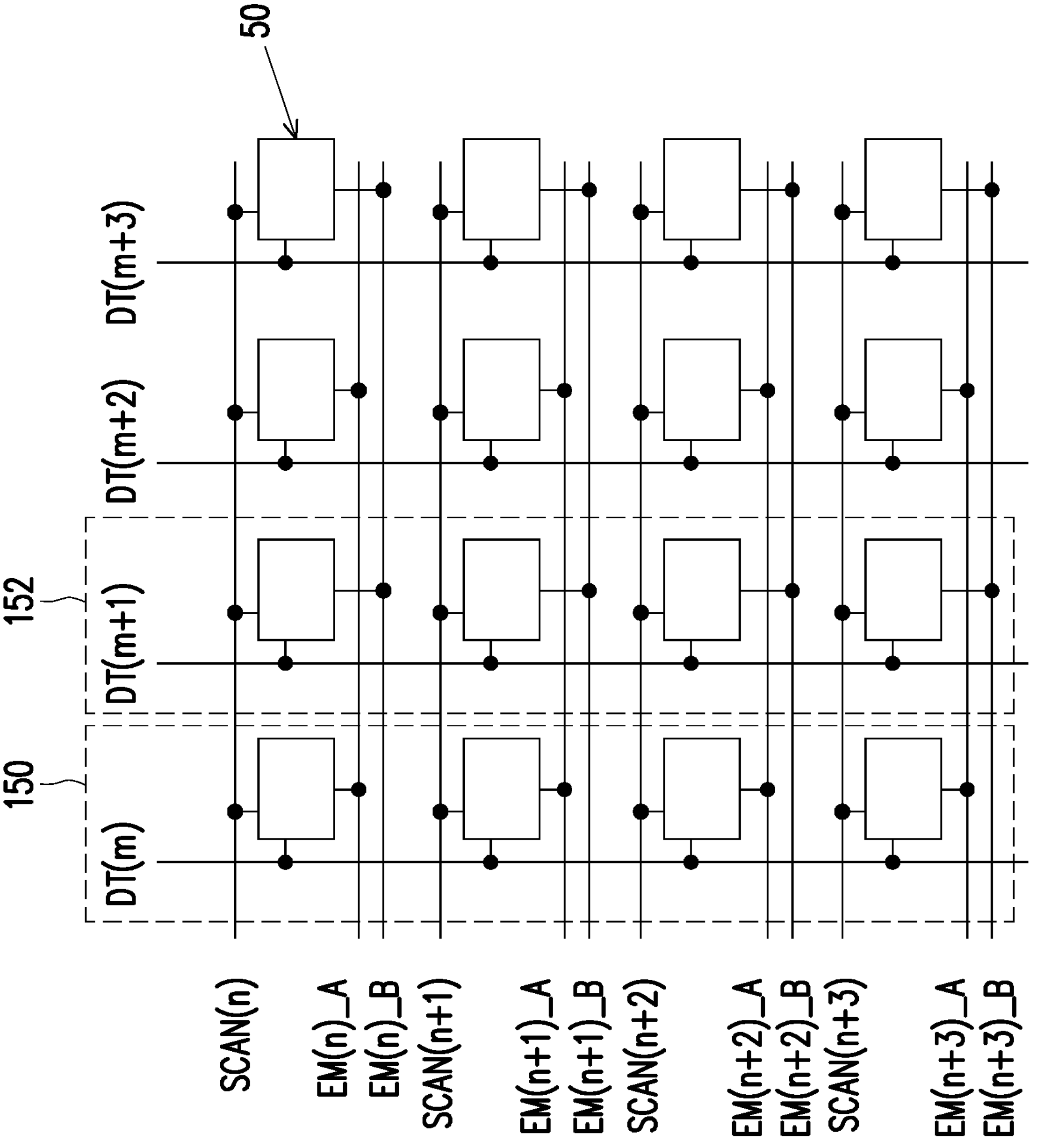
FIG. 15 is a drawing, schematically illustrating the structure of a pixel array of a display device, according to an embodiment of the disclosure.
Figure 16:
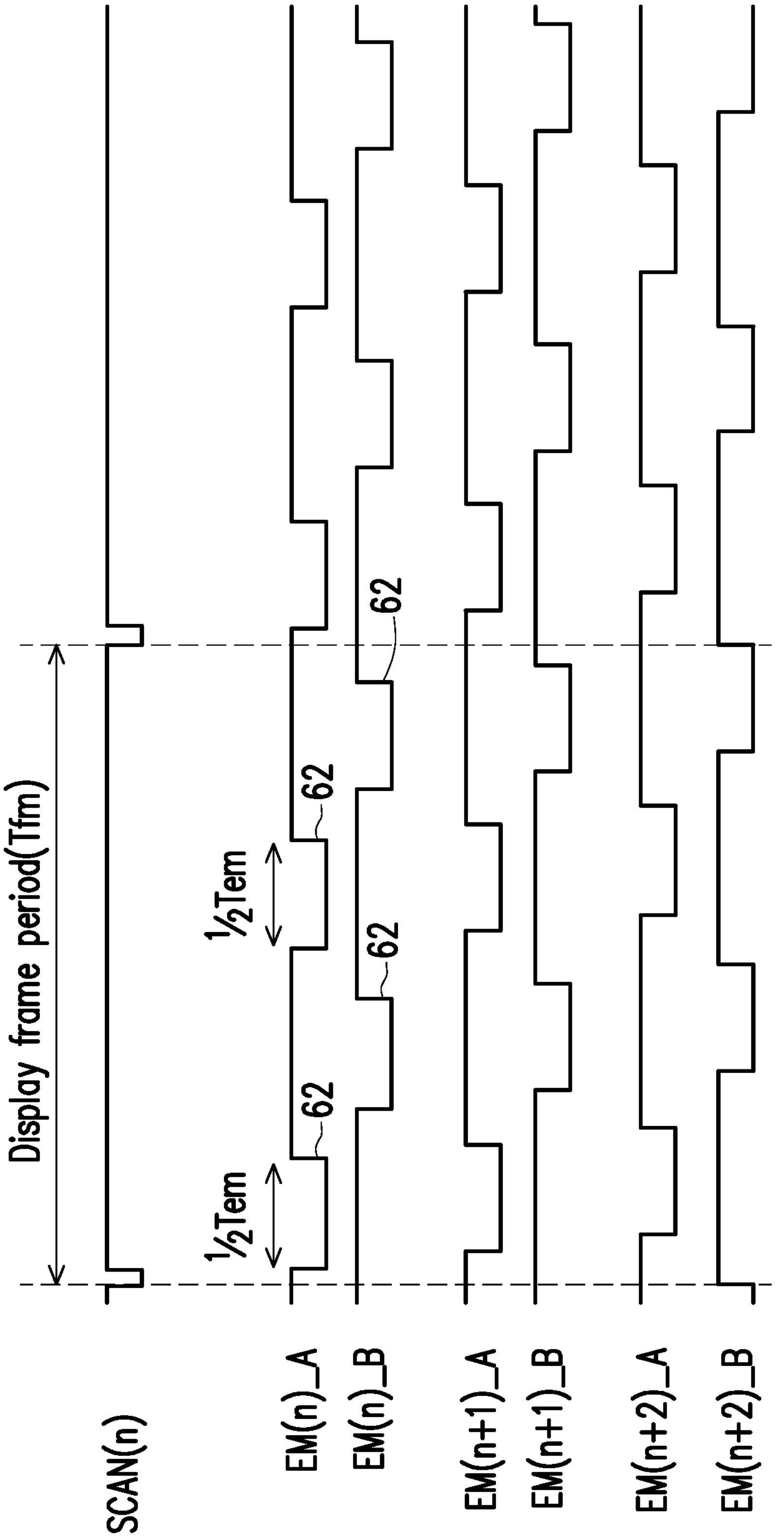
FIG. 16 is a drawing, schematically illustrating the various signals in time sequence, according to an embodiment of the disclosure.

Further in an embodiment, FIG. 15 is a drawing, schematically illustrating the structure of a pixel array of a display device, according to an embodiment of the disclosure. FIG. 16 is a drawing, schematically illustrating the various signals in time sequence, according to an embodiment of the disclosure. Referring to FIG. 15 and FIG. 16, to control the pixel columns 150, 152, one pixel row for the scan signal SCAN(n) needs two enable signals EM(n)_A and EM(n)_B and likewise to other pixel rows with index n+1, n+2, n+3, . . . . Similar to FIG. 8, each of the enable signals EM(n)_A and EM(n)_B has two emission periods 62 in an example. On the other hand, the enable signals with "_A" control the pixel column while the enable signals with "_B" control the abutting pixel column.

Figure 17:
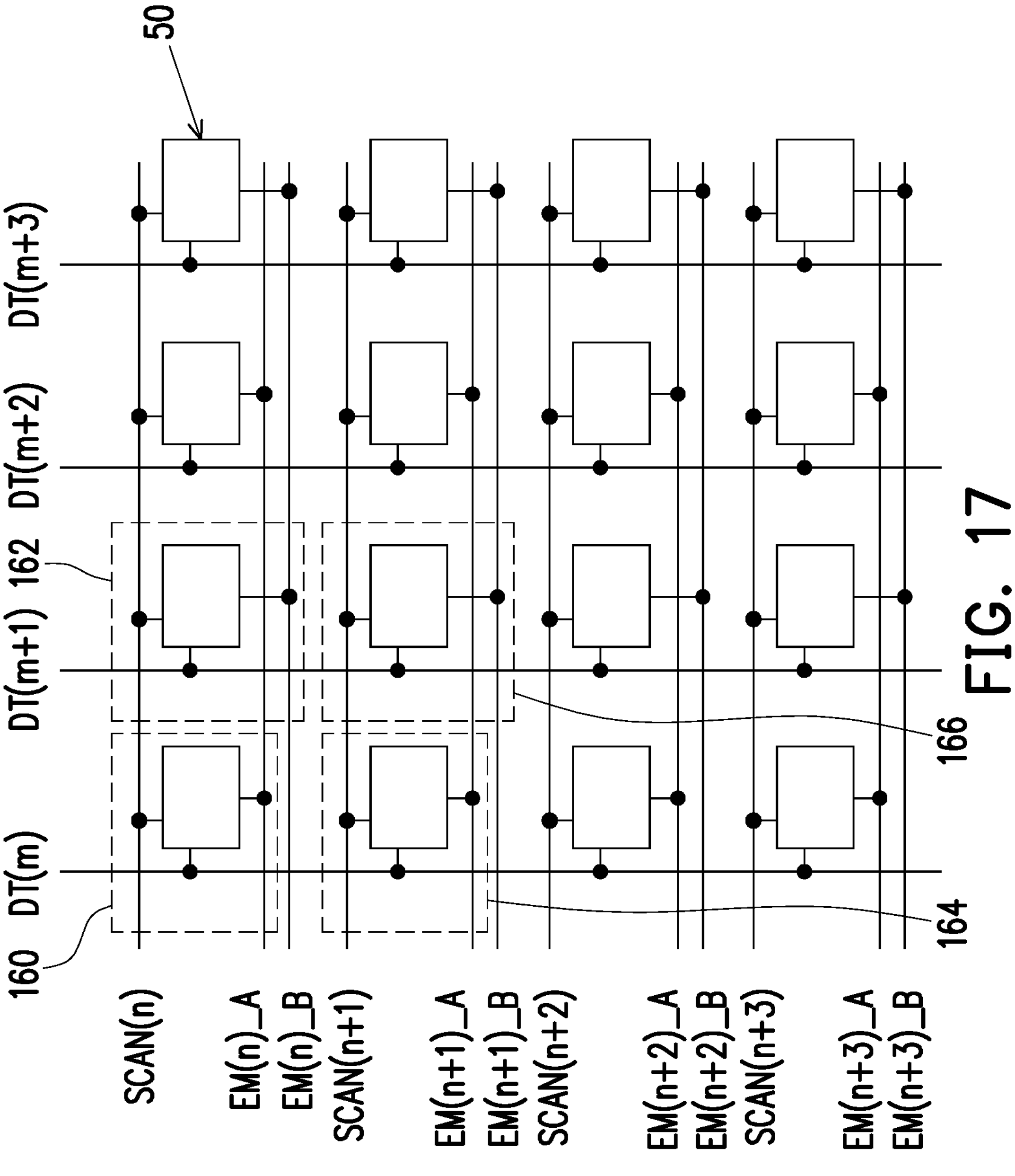
FIG. 17 is a drawing, schematically illustrating the structure of a pixel array of a display device, according to an embodiment of the disclosure.
Figure 18:
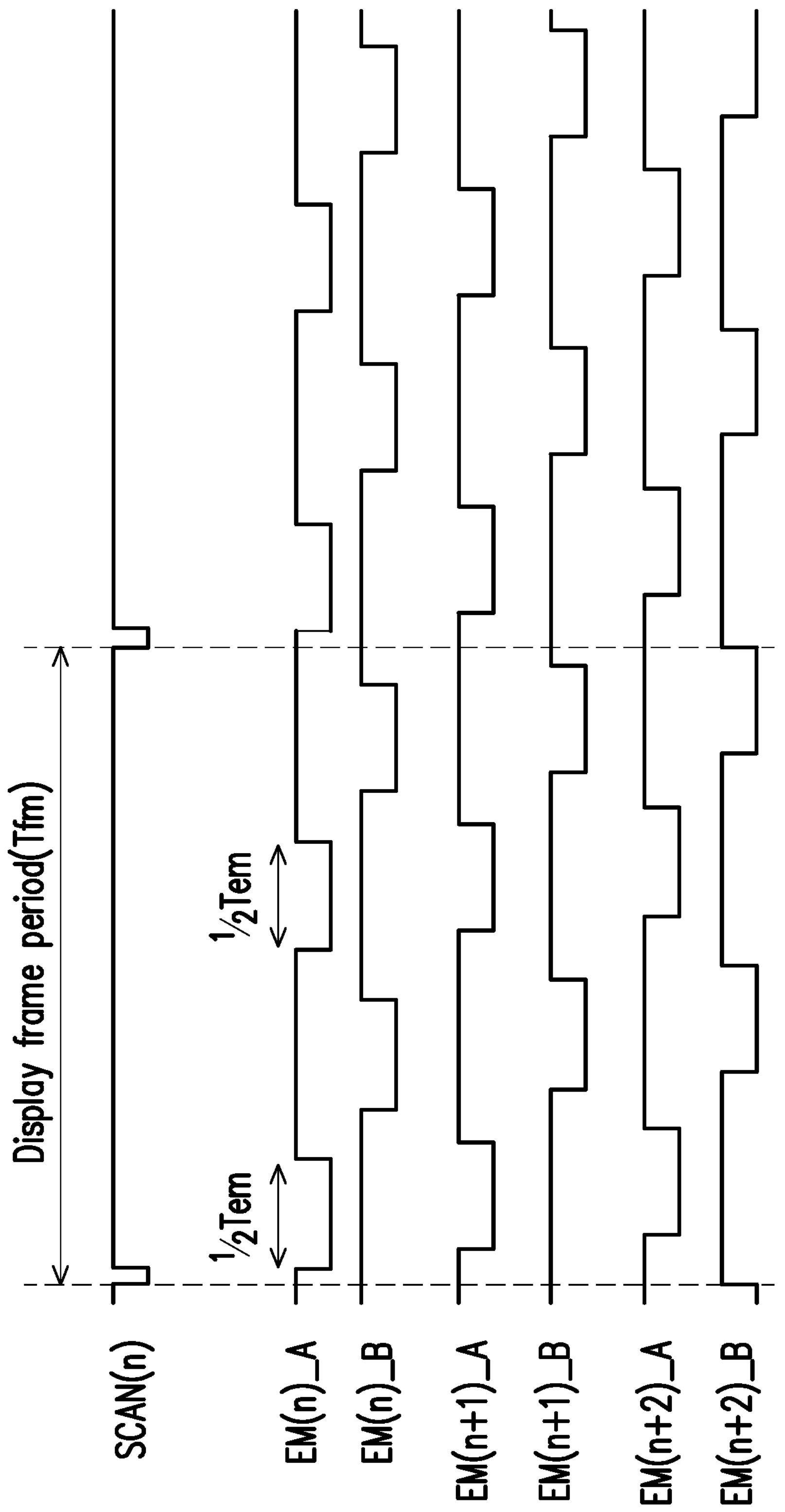
FIG. 18 is a drawing, schematically illustrating the various signals in time sequence, according to an embodiment of the disclosure.

FIG. 17 is a drawing, schematically illustrating the structure of a pixel array of a display device, according to an embodiment of the disclosure. FIG. 18 is a drawing, schematically illustrating the various signals in time sequence, according to an embodiment of the disclosure. Referring to FIG. 17 and FIG. 18, for another embodiment, the abutting pixels in diagonal direction is involved with the feature to divide the emission period 60 into multiple emission periods 62. The first pixel 160 and the pixel 166 are abutting in a diagonal direction, while the third pixel 162 and the fourth pixel 164 are abutting in another diagonal direction.

With the similar manner as described in FIG. 11, on the other hand, the embodiment in FIG. 18 divides the display frame period $T_{fm}$ into two emission cycles. Each of the two emission cycles has the staggering relation, which is the same as the staggering relation in FIG. 11. However, the further combination with the arrangement in FIG. 4 for dividing the emission period 60 can be made as another embodiment.

The disclosure has proposed to divide the emission period 60 as requested by the display device into multiple emission periods to increases the frequency to turn on the light emitting diode. The flicker phenomenon can be reduced.

Further, the emission periods for abutting pixels in row direction, column direction, or the diagonal direction can be arranged, in which the abutting pixels in row direction and column direction can also be realized abutting columns or abutting rows.

Even further, the combination for the above two manners may be made.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A display device, comprising:

a plurality of pixels, configured to be operated in a plurality of frame periods, wherein a first pixel of the plurality of pixels is emitted in at least two first emission periods corresponding to a same first scan pulse in a same frame period and a second pixel of the plurality of pixels is emitted in at least two second emission periods corresponding to a same second scan pulse in the same frame period, wherein each of the plurality of pixels comprises:

a light emitting diode; and a driving circuit coupled to the light emitting diode;

wherein in the same frame period, the first pixel of the plurality of pixels is emitted in the at least two first emission periods and the second pixel of the plurality of pixels is emitted in the at least two second emission periods.

2. The display device according to claim 1, wherein the at least two first emission periods and the at least two second emission periods are staggered.

3. The display device of claim 1, wherein the first pixel and the second pixel are abutting in a column direction of a pixel column, a row direction of a pixel row, or a diagonal direction.

4. The display device of claim 1, wherein in the same frame period, the first pixel emits a first gray level in the at least two first emission periods and the second pixel emits a second gray level in the at least two second emission periods.

5. The display device of claim 1, wherein the same first scan pulse is enabled once in a scan period in each of the plurality of frame periods.

6. The display device of claim 1, wherein lengths of the at least two first emission periods in each of the plurality of frame periods are equal.

7. The display device of claim 1, wherein the at least two first emission periods are uniformly distributed in each of the plurality of frame periods.

8. The display device of claim 1, wherein the at least two first emission periods are non-uniformly distributed in each of the plurality of frame periods.

* * * * *